Oct. 28, 1969     H. M. TURNER ET AL     3,474,754

APPARATUS FOR EDGE COATING ARTICLES

Filed Oct. 11, 1965                                           7 Sheets-Sheet 1

INVENTORS
HOWARD M. TURNER
& JERRY A. KRIZKA

BY
*Mason, Porter, Diller & Brown*
ATTORNEYS

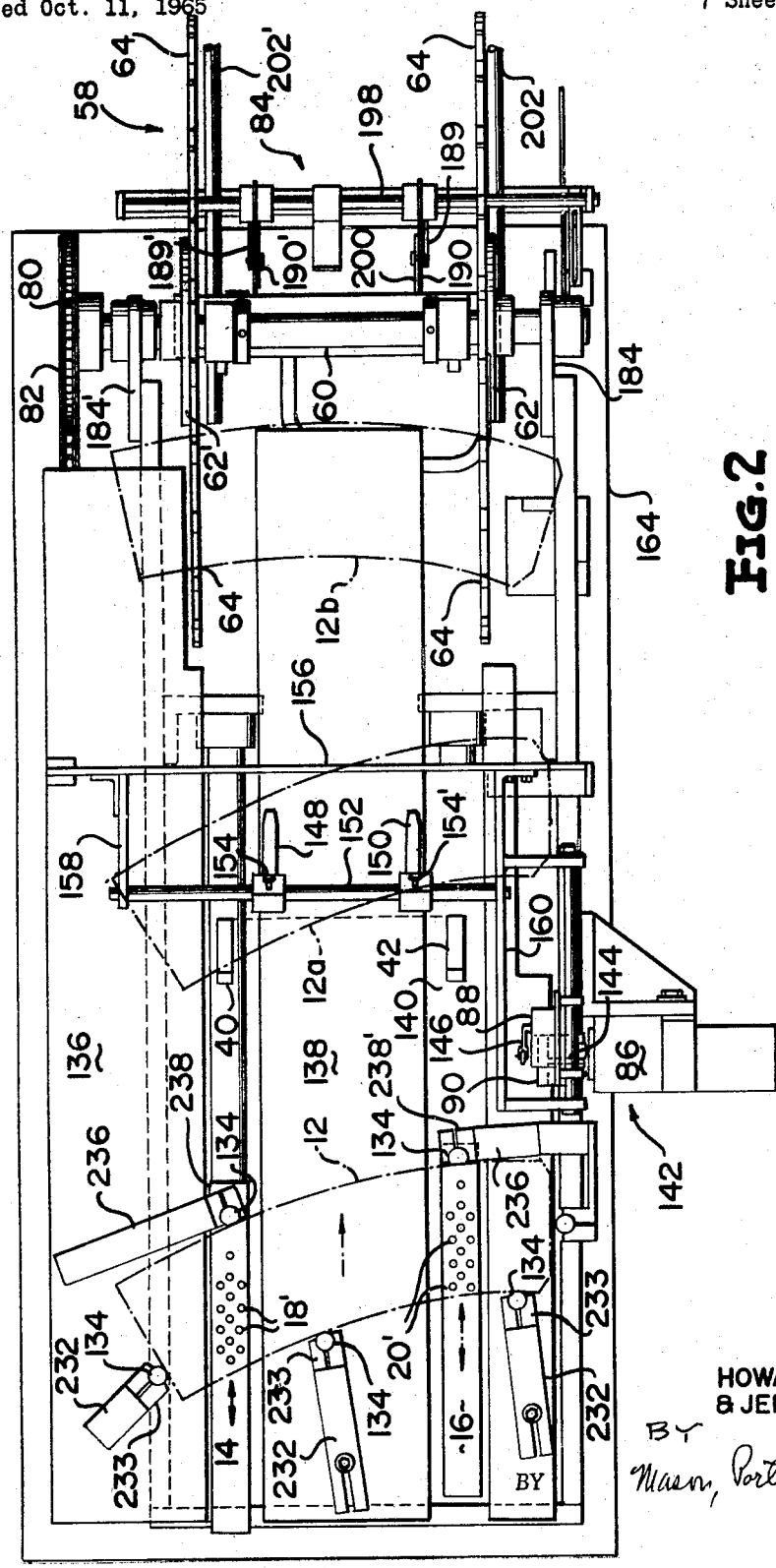

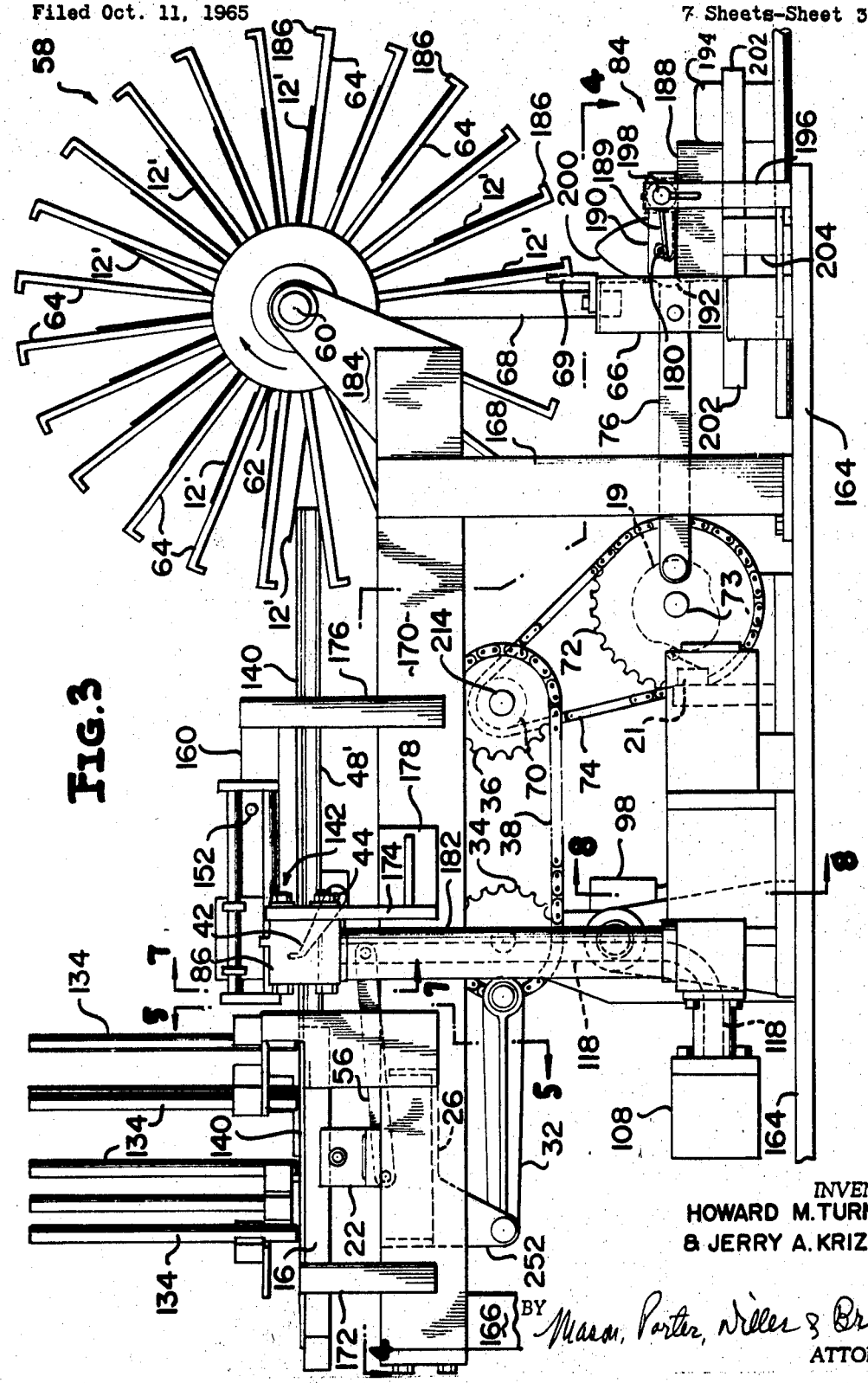

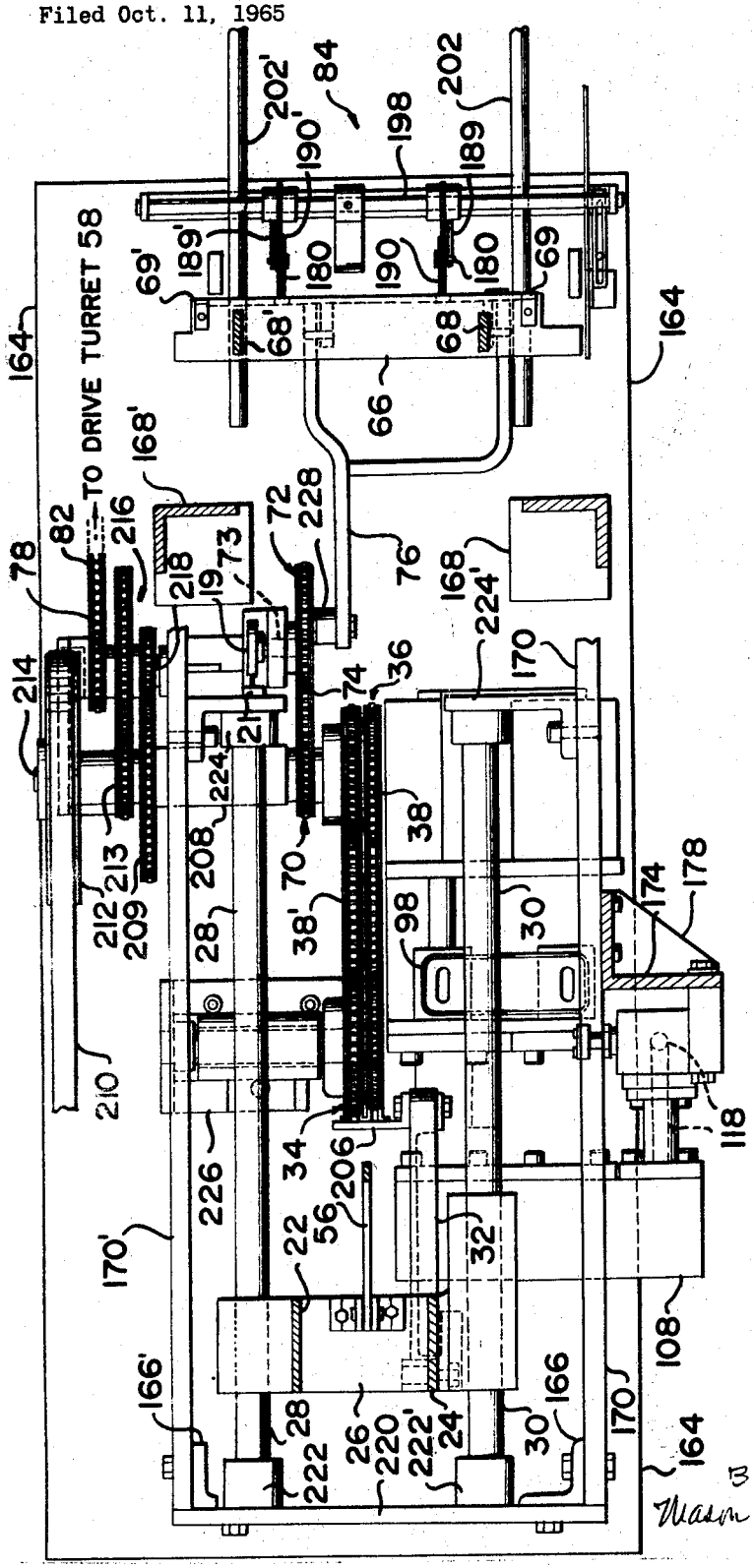

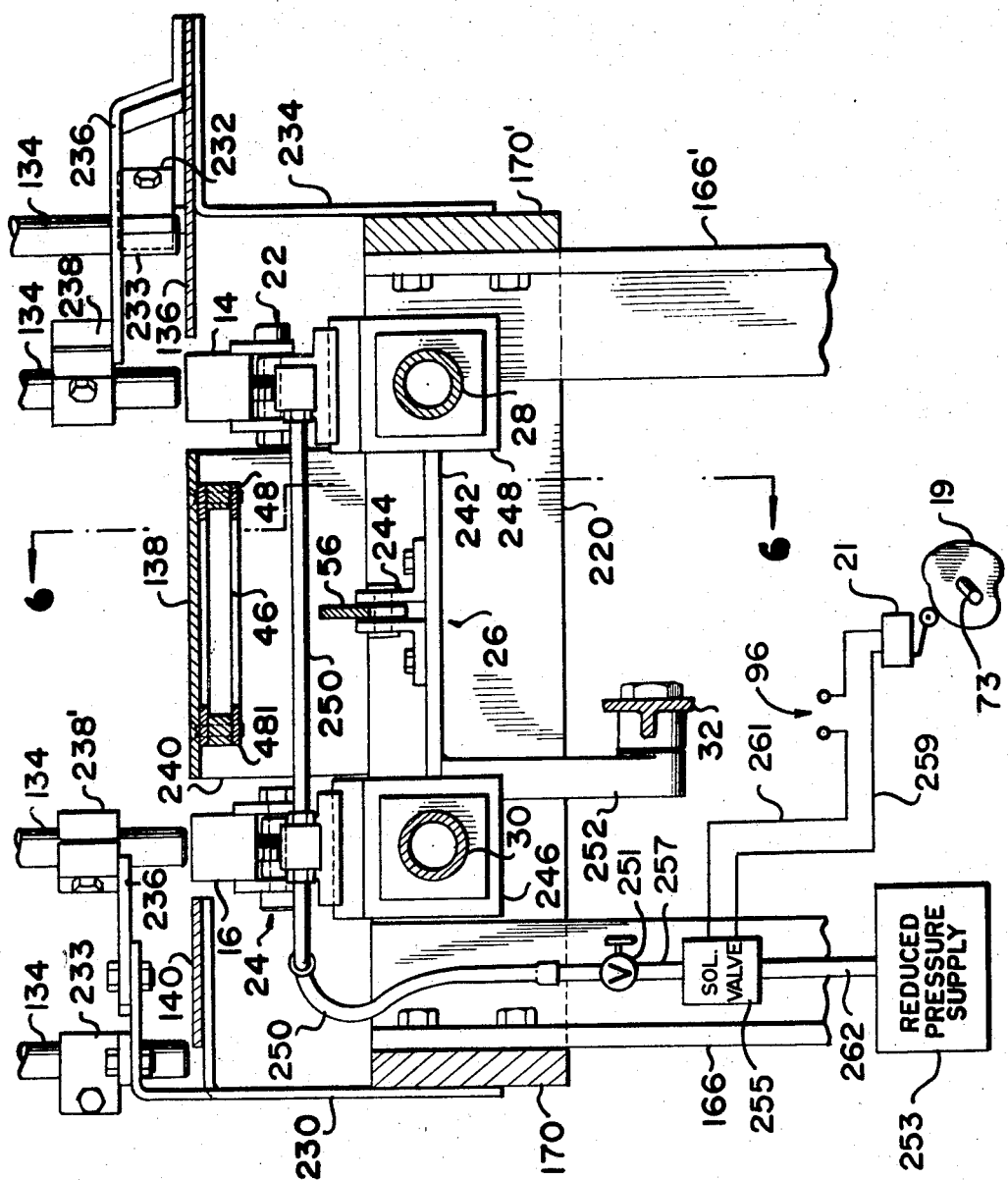

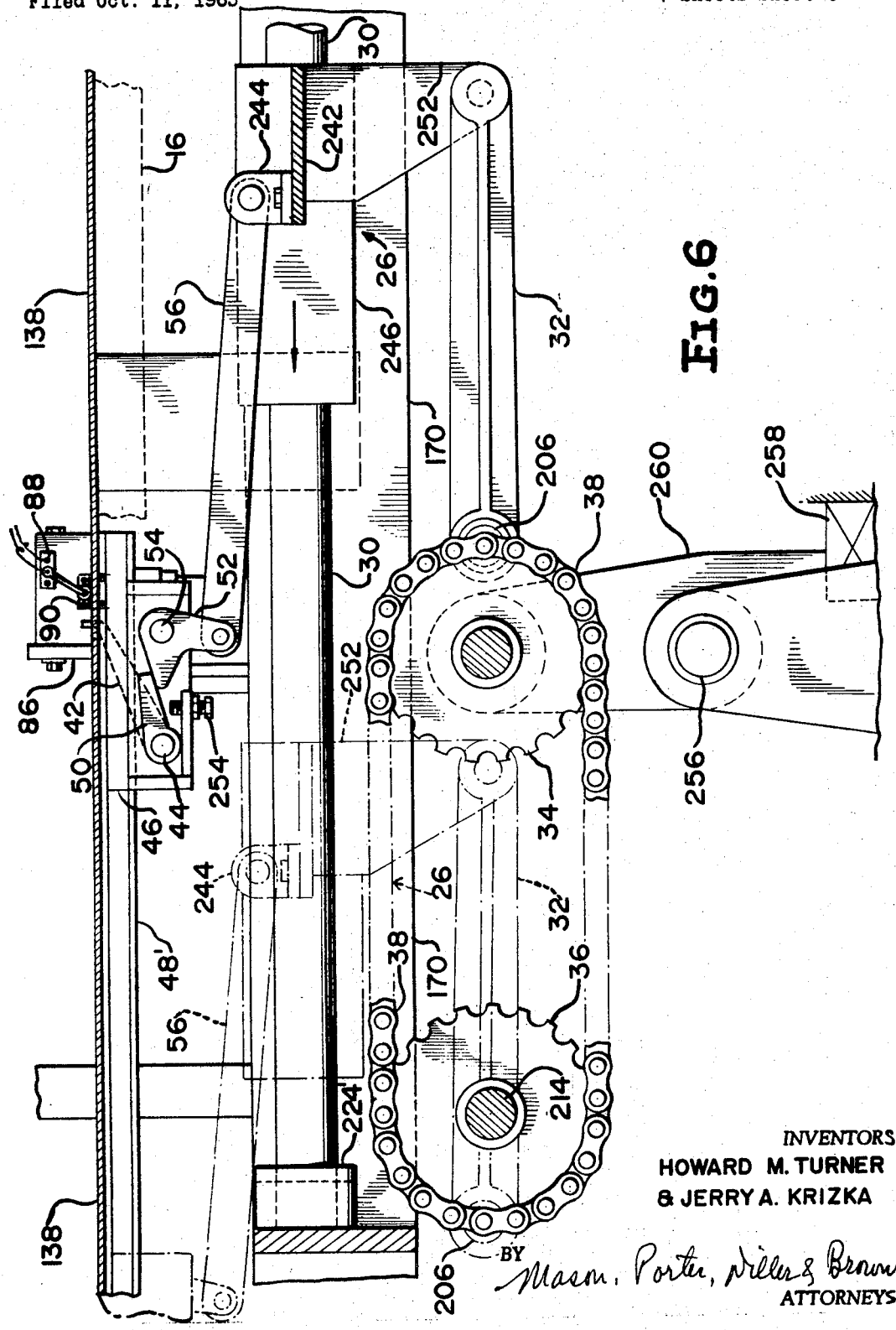

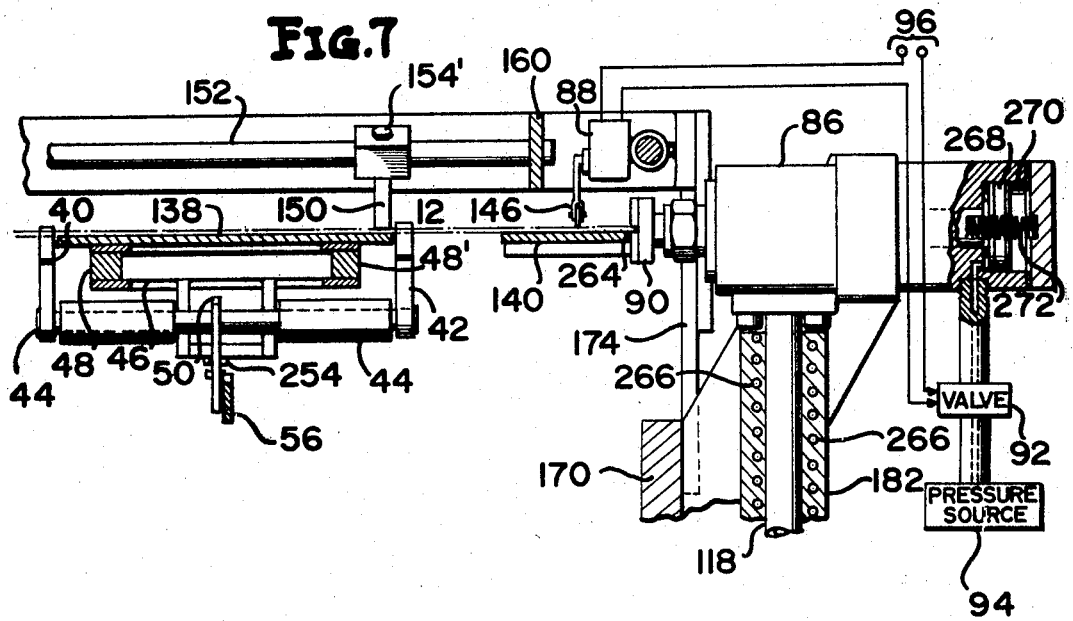
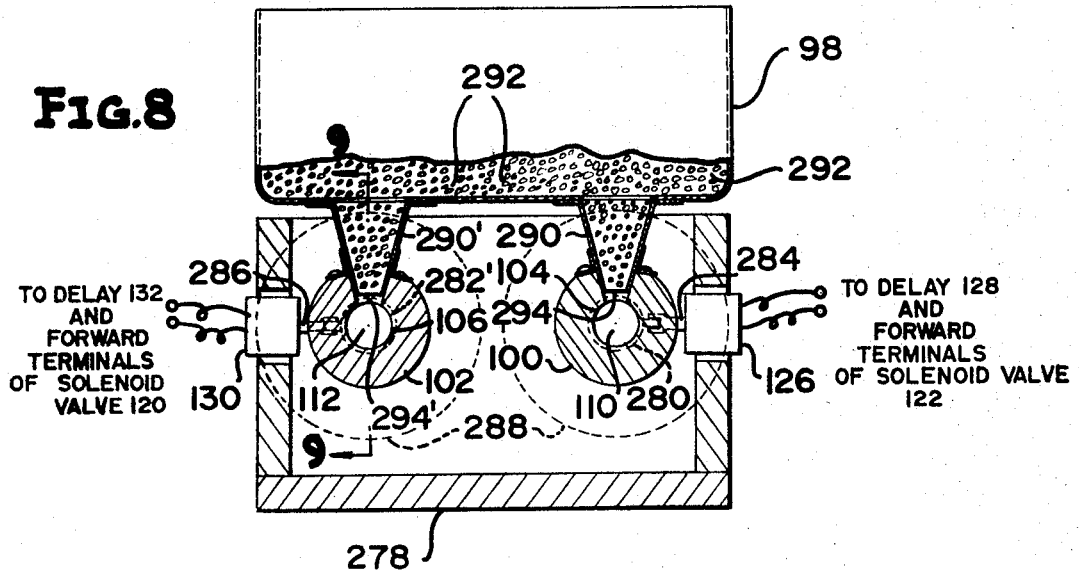
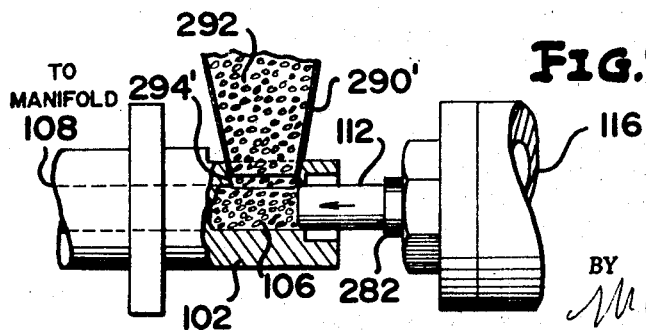

United States Patent Office 3,474,754
Patented Oct. 28, 1969

3,474,754
APPARATUS FOR EDGE COATING ARTICLES
Howard M. Turner, Oak Forest, and Jerry A. Krizka, Markham, Ill., assignors to Continental Can Company, Inc., New York, N.Y., a corporation of New York
Filed Oct. 11, 1965, Ser. No. 494,605
Int. Cl. B05c 11/00, 3/02
U.S. Cl. 118—2
18 Claims

ABSTRACT OF THE DISCLOSURE

Apparatus for edge coating container blanks including an extrusion gun opening into a blank edge receiving channel and coating material supply provisions including alternately actuable material compressing pistons and material heating provisions communicating with the extrusion gun. Conveying provisions include longitudinally movable vacuum bars for serially moving blanks with their edges in alignment with the channel, extensible and retractible blank engaging fingers for removing blanks from proximate the channel and a turret for the drying of blanks prior to the depositing thereof in an output hopper.

---

This invention relates to the coating of articles and more specifically to apparatus for edge coating articles such as paperboard blanks which are subsequently formed into containers suitable for the storage of food products, inedible products, or other materials.

Food tubs, beverage containers, citrus juice containers, etc. are formed from blanks which are usually die cut from a roll of material. This material may be, for example, polyethylene coated paperboard which is coated as a wide roll from which the blanks are subsequently severed. The severing of the blanks from the roll inevitably results in exposed edges, i.e., uncoated surfaces. When a blank is formed into a container, at least one of the uncoated edges or surfaces would be exposed to the product. It has been found necessary to coat this edge or surface in order to seal, protect and strengthen the container.

If the interiorly disposed raw or uncoated edges of a blank formed into a container is not coated, the product exposed to the edge will cause wicking and subsequent delamination occurs. Wicking is a condition wherein the edge of the paperboard blank exposed to a fluid containing product absorbs part of the fluid of the product and causes a separation (delamination) of the paper board laminations. The absorption continues from the edge and in a direction generally parallel to the surface of the blank or wall of the container or tub. Contamination of the product and a general deterioration of the container results. The primary purpose of the present invention is to provide a blank, usually of paperstock of varying thickness and substrate coating, which is suitable for forming into a container body having a longitudinal lap seam and to which a synthetic or natural resin has been applied to the raw interiorly exposed edge of the lap seam so as to seal the edge and to protect and strengthen the container body formed from the blank so sealed. Some containers, such as frozen food containers, are subject to moisture penetration through the exteriorly exposed edge of the lap seam of the container body and this edge as well as the interior edge may be coated in accordance with the teachings of the invention. The invention also envisions the method and the apparatus for forming blanks of the type set forth.

Accordingly, it is the principal object of the present invention to improve the quality of blanks suitable for use as container bodies.

It is a further object of the present invention to provide a blank suitable for use as a container body which is not subject to wicking or delamination.

It is a further object of the present invention to provide a blank, severed from a roll of surface coated material, which is extrusion coated on at least one of the severed edges.

It is a further object of the present invention to provide an apparatus for edge coating a surface coated blank so that the coated edges become moisture resistant.

It is a further object of the present invention to provide an apparatus for seriatim advancement of paperboard blanks past a coating station formed of a channel in which an extruder gun is positioned.

It is a further object of the present invention to provide an apparatus for seriatim advancement of a paperboard blank from an input hopper, past a coating station formed of a channel in which an extruder gun is positioned, through a drying station, and to an output or stacking hopper.

It is a further object of the present invention to provide a coating apparatus having a coating station formed of a channel in which an extruder gun is positioned and a coating supply system of interconnected, alternately actuated, reciprocating pistons cooperating with raw coating supply hoppers to deliver the coating material to the coating station at a rate commensurate with the deposition rate upon the objects to be coated.

These and other objects of the present invention are accomplished in the following manner. The invention proposes extruding, in an intermittent fashion, a synthetic resinous product such as a low molecular weight polyethylene, through an extrusion nozzle on to the edge of the previously flat surface coated paperstock or blank. This extruded material adheres to the edge of the blank and when the blank is fabricated into a container with the coated edge on the interior thereof, wicking of the product and subsequent delamination is inhibited. Whereas low molecular weight polyethylene is set forth, many other synthetic or natural resins of a suitable nature may be used.

More specifically, the input hopper of the apparatus is filled with blanks to be edge coated. The extrudable material to be employed is heated to the proper viscosity and temperature in a pneumatically operated extruder which is equipped with heated transfer lines connected to the die, to make it free flowing and sufficiently tacky to adhere to the edge of the blank. After the desired temperature has been reached, the plastic or extrudable material air cylinders are energized. After the main drive motor is energized, vacuum is supplied to the vacuum control valve and compressed air is supplied to the plastic delivery air cylinders and to the extruder gun controlling air cylinder.

A pair of vacuum bars positioned under the stack of blanks in the input hopper, will commence their cycle of movement as well as the blank advance fingers, the drying turret, and the blank pusher plate.

When the vacuum bars are positioned under the stack of blanks a vacuum valve will be actuated to reduce the pressure within the vacuum bars by means of a cam operated vacuum control switch. The vacuum bars grip the lowermost blank and move it forward toward an extruder gun while the remaining blanks in the hopper are restrained. The vacuum bars introduce the edge of the blank to be coated into a channel in which is positioned the extruder gun. When the blank is adjacent the extruder gun, the blank will actuate a switch which controls the operation of the extruder gun to initiate the application of the plastic to the edge of the blank. As the blank is conveyed past the nozzle or die of the extruder gun, the extrudate is automatically applied to the portion of the edge requiring the coating. When the edge has been completely coated, the extrusion of the extrudate or plastic then ceases until the next blank is presented for coating. The vacuum bars are then vented to the atmosphere so as to release the coated blank. The vacuum bars then retract to pick up another blank for coating. On the next forward stroke of the vacuum bars, a pair of pusher fingers engage the first coated blank so as to advance this blank to the turret where it remains for a sufficient time to permit the edge coating to harden before it is stacked at the discharge or output hopper by a pusher plate. The second blank to be coated is advanced toward the channel housing the extruder gun while the first coated blank is advanced toward the output hopper. Thereafter, the cycle continues.

The plastic or extrudate is supplied by a system including a pair of interconnected, alternately actuated, reciprocating cylinders which advance pistons from a raw coating material (for example, plastic pellets) receiving positions to a forward position which advances the extrudate toward the extruder gun, the plastic extrudate being heated as it is advanced.

The invention both as to its organization and method of operation together with further objects and advantages thereof will best be understood by reference to the following specification taken in conjunction with the accompanying drawings in which:

FIGURE 2 is a plan view of the apparatus of the present invention and illustrating the path of the blank from its input hopper, past the coating station, to the drying station and finally to the output hopper;

FIGURE 3 is a side elevational view of the apparatus;

FIGURE 4 is a sectional view taken along the line 4—4 of the FIGURE 3 and principally illustrating the driving mechanism of the apparatus;

FIGURE 5 is a sectional elevation view taken along the line 5—5 of the FIGURE 3 and illustrating the initial portion of the feed table and the vacuum bars for advancing the blanks for a portion of their travel;

FIGURE 6 is a partial sectional elevation view taken along the line 6—6 of the FIGURE 5 and showing the details of the blank engaging fingers and its actuating mechanism;

FIGURE 7 is a partial sectional elevation view taken along the line 7—7 of FIGURE 3 and illustrating the details of the coating station including the blank sensing switch and the channel associated with the extruder gun;

FIGURE 8 is a partial sectional elevation view taken along the line 8—8 of the FIGURE 3 and showing the hopper for supplying extrudate to the coating station; and FIGURE 9 is a partial sectional elevation view taken along the line 9—9 of the FIGURE 8 and illustrating the manner in which the extrudate, in the form of plastic pellets, is introduced into the system ahead of an advancing piston.

Figure 1:
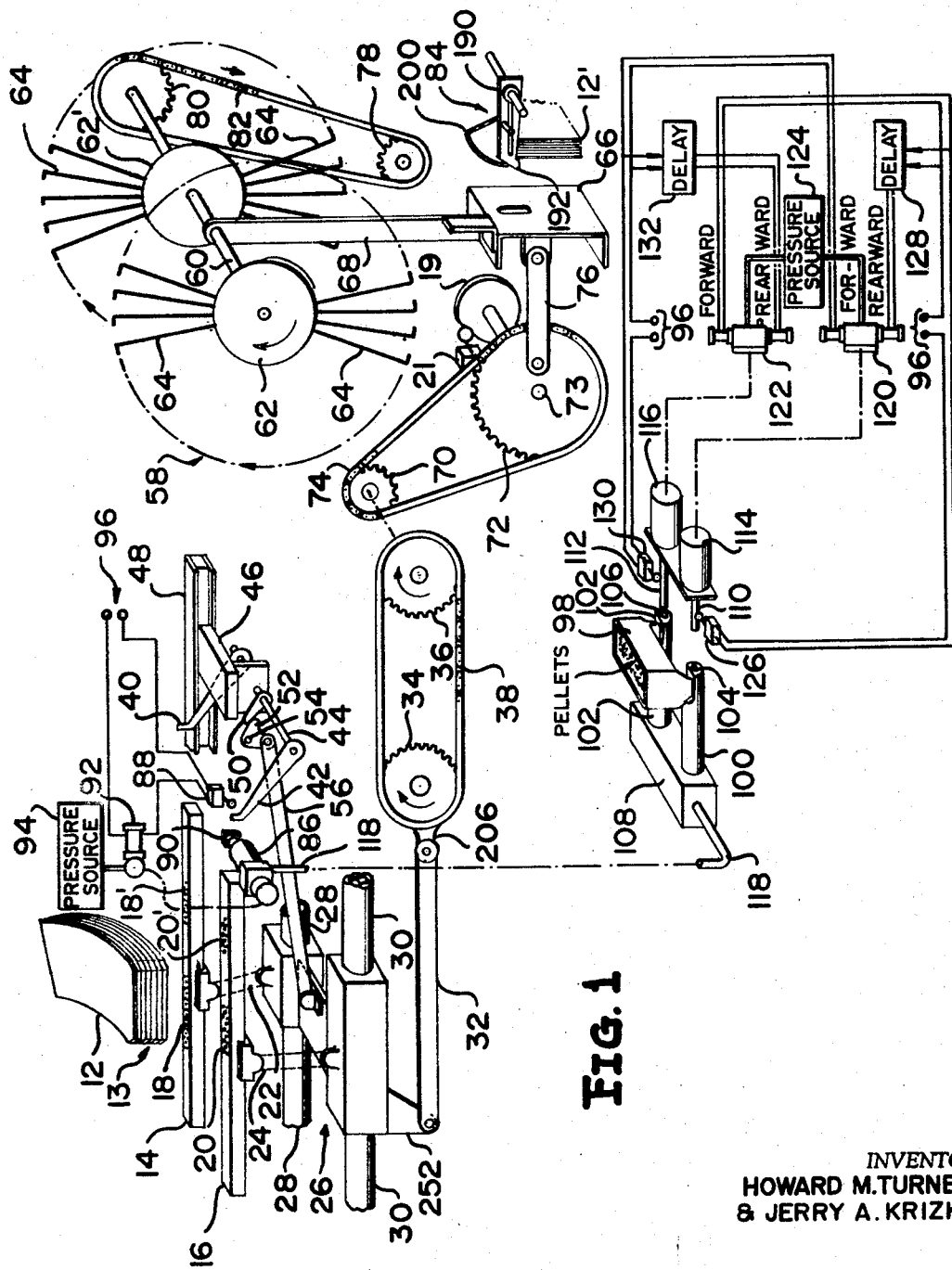
FIGURE 1 is a diagrammatic perspective view illustrating the blank advancing apparatus and the apparatus for supplying the coating material to the system.

With reference to the diagrammatic perspective view of the FIGURE 1, a stack of uncoated blanks 12, having the uncoated edges 13 to be coated, is positioned above a pair of substantially horizontal vacuum blank advancing bars 14 and 16. Although the blanks 12 are designated as being uncoated blanks, it will be understood that the flat surfaces of the blanks would usually be coated and that the "uncoated" refers to the edge or surface 13 to be coated in the practice of the present invention. The advancing bar 14 has two spaced apart sets of apertures 18 and 18' formed in its upper surface while the advancing bar 16 has similar sets of spaced apart apertures 20 and 20'. When the pressure is reduced within the advancing bars 14 and 16, to be hereinafter described, air will be drawn in through the apertures 18, 18', 20 and 20', so that a blank positioned above any of the apertures will be securely gripped and advanced by the advancing bars 14 and 16. The two sets of apertures are provided for coating blanks of different dimensions and if one set of apertures is unused, it may be conveniently valved off by any suitable valve means as will be hereinafter set forth.

The vacuum blank advancing bars 14 and 16 are secured by a pair of connections 22 and 24, respectively, to a carriage 26 which slides upon the slide bars 28 and 30. The slide bars 28 and 30 are stationary while the carriage 26 reciprocates and carries along with it the advancing bars 14 and 16. It will be understood that a reduced pressure means is applied to the advancing bars 14 and 16 at the proper time as controlled by a timing cam 19 and an associated switch 21, as will be described.

The carriage 26 is reciprocated upon the slide bars 28 and 30 by a pitman 32 having one end connected to an extension 252 from the carriage 26 and its other end connected to a bracket 206 which is coupled to a chain 38 about a sprocket 34. The sprocket 34 is driven from a main power source through the chain 38 from a drive sprocket 36.

With continued reference to the FIGURE 1, the advancing bars 14 and 16 advance the blanks 12 for a portion of the distance to a receiving turret, to be hereinafter described, while a pair of advancing fingers 40 and 42 engage each successive blank, after it has been coated to continue its advancement to the hereinafter described turret, said coated blank being designated as 12'. The blank advancing fingers 40 and 42 are mounted upon a shaft 44 which is supported for pivotable movement by a finger slide block 46 having a substantially vertical portion which supports the shaft 44 and a portion substantially horizontal which slides within a pair of channeled guides 48 and 48', only one of which is shown in the FIGURE 1, the channel guide 48' being omitted for the purposes of clarity. Affixed to the shaft 44 is a lever 50 which engages a bellcrank 52 whose position will permit the lever 50 to rotate and thereby determine the position of the advancing fingers 40 and 42. The bellcrank 52 is arranged for limited pivotal movement upon the slide block 46 by a stud 54. One end of the bellcrank 52 is connected to the carriage 26 by a pitman 56 and it is through the pitman 56 that the slide block 46 receives its reciprocating motion.

In the position shown in the FIGURE 1, the slide block 46 would be moving rightwardly and the fingers 40 and 42 would be engaging a coated blank 12' for advancement to the turret, indicated at 58. During this cycle of operation, the bellcrank 52 is urged in its most counterclockwise position, so that the lever 50 is driven clockwise, thereby raising the advancing fingers 40 and 42 into position for engaging a coated blank 12', as it emerges from the coating station, to be hereinafter described. At the end of the delivery or advancement cycle, the advancing bars 14 and 16 are vented to the atmosphere so as to release a now coated blank 12', and the carriage 26 is driven rearwardly or to the left as viewed in the FIGURE 1. The pitman 56 now rocks the bellcrank 52 clockwise so that the lever 50 follows the contour of the bellcrank 52 and thus permits the advancing fingers 40 and 42 to move downwardly and below the plane of the coated blank 12' now awaiting at the coating station to be transferred to the turret 58. Thereafter, the rotation of the bellcrank 52 about its stud 54 in a clockwise direction is halted by a suitable stop means (not shown) and the finger slide block 46 is carried rearwardly or to the left, as viewed in the FIGURE 1. The blank advancing fingers 40 and 42 remain below the plane of the coated blank 12′ but when the carriage 26 has reached the end of its rearward travel, the advancing fingers 40 and 42 will again be pivoted upwardly so as to engage the coated blank 12′ and the pressure will be reduced in the advancing bars 14 and 16 so as to deliver another uncoated blank 12 to the coating station.

With continued reference to the FIGURE 1 it will be observed that the turret 58 is comprised of a shaft 60 which is rigidly supported although mounted for rotational movement upon the frame of the apparatus (not shown) and includes a pair of hubs 62 and 62′ having a plurality of blank retaining fingers 64 extending therefrom. A blank 12′ is delivered to the turret 58 between adjacent pairs of retaining fingers 64 and delivered to an output hopper immediately in front of a pusher plate 66, which pusher plate 66 is supported from the shaft 60 by a pair of suspending bars 68 and 68′ only one of which is shown. Power is supplied to the turret 58 from the drive sprocket 78 through the chain 82 and the sprocket 80 attached to the shaft 60. The pusher plate 66 is driven in a reciprocating motion by a crank arm 76 which is pivotally connected to the face of the sprocket 72 by any suitable means to permit the rotation thereof and to a stud secured to a bracket joined to the pusher plate 66. The sprocket 72 is fixed to a stub shaft 73 for rotation therewith as is the timing cam 19. The blank output hopper immediately adjacent the pusher plate 66 includes the means 84 for retaining the blanks 12′ in a substantially vertical position once they are released from the turret 58 and stacked by the pusher plate 66.

A salient feature of the invention is the ability of the system to advance a blank through the coating station in such a manner that a uniform and continuous coating is applied to the edge and, if desirable, to the edge only, of the blank to be coated. The blank advancing mechanism comprising the vacuum blank advancing bars 14 and 16 and its associated mechanisms, has been described. At this point, the coating station and its associated circuitry and mechanism including the plastic or extrudate supply system will be discussed in detail.

As shown in the FIGURE 1, and in greater detail to be discussed with later reference to the FIGURE 7, the coating station includes an extruder gun 86 positioned along the blank path and a sensing means, such as a switch 88 connected in circuit with the actuating mechanism for the extruder gun 86 so as to be responsive thereto. Coupled to and communicating with the extruder gun 86 is a blank edge guide 90 which houses the discharge orifice of the gun 86 and has formed along its face a channel which receives the edge of the uncoated blanks 12 which are to be coated. The blanks 12 are advanced by the advancing bars 14 and 16 and as the edge to be coated starts to pass through the channel formed in the edge guide 90, the switch 88 will actuate a solenoid operated valve 92 which then permits a pressure source 94 to actuate a valve within the extruder gun 86 and thereby commence the extruding or spraying operation upon the edge 13 of an uncoated blank 12 so that it now becomes a coated blank 12′. Although the embodiment shown and described, illustrates the movement of the blank 12 with respect to the extruder gun 86 and edge guide 90, it is envisioned that the extruder gun 86 and edge guide 90 could be moved relative to the blank 12, and such an embodiment would be readily apparent to one skilled in the art. If a uniform and continuous coating is to be applied to the edge 13 of a blank 12, then the requirement is that relative movement exist between the blank 12 and the extruder or coating means. It will be understood that a suitable source of controlled electrical energy would be applied to a pair of terminals 96 so as to supply the necessary energy to actuate the valve 92 as indicated by the position of the switch 88.

The manner in which the extrudate (a synthetic resinous product such as a low molecular weight polyethylene) is supplied to the extruder gun 86, is illustrated in the lower portion of the FIGURE 1. The plastic pellets are supplied to a hopper 98, which hopper 98 will be discussed in greater detail with reference to the FIGURE 8. The hopper 98 communicates with a pair of cylinders 100 and 102 having the bores 104 and 106, respectively, formed therein for receiving the plastic pellets. The plastic pellets are forced into an electrically heated manifold 108 by a pair of alternately reciprocating pistons 110 and 112 to which driving power is applied by a pair of associated air cylinders 114 and 116 respectively. The bore 104 is adapted to receive the piston 110 while the bore 106 is adapted to receive the piston 112. The bores 104 and 106 extend into the manifold 108 and an electrically heated conduit 118 supplies the viscous plastic to the extruder gun 86.

The air cylinders 114 and 116 are controlled by a pair of solenoid valves 120 and 122, respectively, coupled thereto. Each of the solenoid valves 120 and 122 are bistable wherein the first stable position supplies fluid, such as air, to advance or drive a piston forward and the other stable position supplies fluid to reverse or to drive rearwardly, the piston. For example, a pressure source 124 is connected to each of the solenoid valves 120 and 122. A switch 126 is positioned adjacent the piston 110 and when the piston 110 nears the end of its forward travel (leftwardly as viewed in the FIGURE 1), an enlarged portion on the piston (not shown) will actuate the switch 126 so as to cause a source of electrical energy coupled to the terminals 96 to be supplied to the solenoid valve 22 to drive the piston 112 of the cylinder 116 forward and, in adition, to a delay circuit 128 so as to drive the piston 110 of the cylinder 114 rearwardly after the expiration of the delay imposed by the circuit 128. Similarly, a switch 130 will close a circuit as its associated piston 112 approaches the limit of its forward motion so that an electrical energy source coupled to the terminals 96 will cause application of the electrical energy to the solenoid valve 120 and thereby permit the pressure source 124 to drive the piston 110 of the cylinder 114 forwardly. In addition, a delay circuit 132 will be energized by the switch 130 and after the expiration of the delay imposed by the circuit 132, the solenoid 122 will permit the pressure source 124 to drive the piston 112 of the cylinder 116 rearwardly.

The operation of the extrudate supply system will now be set forth in greater detail. Plastic pellets are supplied to the hopper 98 and the manifold 108 and the conduit 118 are brought up to the desired temperature by any convenient heating means, not shown. In addition, the extruder gun 86 would also be temperature controlled. One of the pistons 110 or 112 will be in the retracted or rearward position while the other piston is exerting pressure on the plastic to feed it into the manifold 108 and via the conduit 118, to the extruder gun 86. For the purposes of explanation, assume that the air cylinder 114 has its associated piston 110 retracted and plastic is being fed by the air cylinder 116 and its associated piston 112. When the piston 112 nears the end of its forward stroke, the normally open switch 130 associated therewith will be caused to close. This action will initiate the start of the cycle of the time delay relay 132. It will also directly energize the forward terminals of the solenoid valve 120. The solenoid 120 when energized shifts the valve spool (internally of the solenoid) so that as to direct compressed air from the source 124 against the head end of the piston of the air cylinder 114 causing the piston 110 associated therewith to begin its forward stroke and to begin to compress the plastic pellets that have fallen by gravity from the hopper in front of the piston 110 when it was in its retracted position.

The time delay period of the time delay relay 132 now expires permitting electrical energy to be delivered to the solenoid valve 122 at its rearward terminals. The operation of the solenoid valve 122 positions the valve spool to supply compressed air from the pressure source 124 to the rod end of the air cylinder 116. This causes the piston 112 to retract all the way rearwardly permitting plastic pellets from the hopper 98 to fall in front of the piston 112. The contacts of the switch 130 open and the time delay relay 132 will be conditioned to begin another operation when the switch contacts of the switch 130 are again closed.

When the piston 110 of the cylinder 114 now nears the end of its forward stroke, the contacts of the switch 126 will be caused to close and directly energize the solenoid valve 122 at its forward contacts. This action will shift the valve spool to cause the retracted piston 112 of the air cylinder 116 to advance the commence feeding plastic pellets into the plastic heating manifold 108. After a time delay induced by the delay 128, the solenoid valve 120 at its rearward contacts is energized to retract the piston 110 of the air cylinder 114. The contacts of the switch 126 associated with the air cylinder 114 will thus be caused to again open and the time delay relay becomes reset to start another time delay operation upon the reclosing of the switch 126. The cycle then continues to repeat as set forth.

The FIGURE 2 is a plan view of the invention wherein the stack of uncoated blanks 12 is positioned by a plurality of vertical adjustable hopper bars 134 which define the input hopper. It will be readily understood that the hopper bars 134 may be positioned as found convenient according to the dimensions and configuration of the blanks to be coated. Further, the forward hopper bars are positioned slightly above the feed table by cantilever brackets 236 which support the clamping members 238 and 238' and engage the forward bars 134 so as to permit a single uncoated blank 12 to pass thereunder. The three rearward bars 134 are supported by clamping members 233 engaged by the brackets 232.

A feed table having a first section 136, a second section 138, and a third section 140 supports the blanks 12 as they progress from the input hopper to the coating station and to the turret 58. The feed table is in three sections so as to permit the vacuum blank advancing bar 14 to be positioned between the sections 136 and 138 and the vacuum blank advancing bar 16 to be positioned between the sections 138 and 140. When the pressure is reduced within the advancing bars 14 and 16, the lowermost blank 12 adheres to the advancing bars 14 and 16 and when forward motion is imparted to the advancing bars, the blank 12 is carried forward with an uncoated edge entering the coating station generally indicated at 142. The coating station 142 includes the extruder gun 86, the switch 88 and the blank edge guide 90. As the edge of the blank 12 to be coated enters the channel formed in the blank edge guide 90 and approaches the discharge orifice indicated at 144, a lever arm 146 coupled to the switch 88 will engage an edge of the blank 12 and close the contacts of the switch 88, thus, signalling the extruder gun 86 that the extrudate (plastic) is to be applied to the edge of the blank 12 now positioned before the discharge orifice in the channel of the blank edge guide 90.

With continued reference to the FIGURE 2, after the edge of the blank 12' has been coated, it continues its advancement by the advancing bars 14 and 16 to a position indicated at 12a and under a pair of blank hold-down fingers 148 and 150. The blank hold-down fingers 148 and 150 are in the form of leaf springs and are mounted for adjustable support upon a shaft 152 by the adjusting bolts 154 and 154', respectively. The shaft 152 is supported from a member 156 at one end by a bracket 158 and at its other end near the coating station 142 by a longer bracket 160 which extends approximately up to the input hopper. The member 156 is substantially parallel to the shaft 152 and is secured in an upright position at its ends by connections to the apparatus frame. While the hold-down fingers 148 and 150 are retaining the blank in the position shown at 12a, the advancing fingers 40 and 42 which were described with reference to the FIGURE 1 have now moved rearwardly and will now be driven forwardly and upwardly so that the tips of the advancing fingers 40 and 42 will engage the rearward edges of the blank 12a.

Continuing, the advancing fingers 40 and 42, which will be described in detail with reference to subsequent figures, will advance the blank 12' along a feed table of three sections 136, 138 and 140 to the position indicated at 12b which is between adjacent pairs of blank retaining fingers 64 projecting from the turret 58. It will be noted that the blank in the position 12b is not driven all the way into the turret 58 and against the hubs 62 and 62' since this would cause damage to the blank. However, as the turret 58 rotates about its shaft 60 the blank will slowly drop against the hubs 62 and 62' without damage. Thereafter, the blanks are delivered to the output hopper, generally indicated at 84, the stacking in the output hopper being assisted by the oscillation of the pusher plate 66 and a pair of pivotally mounted arms 190 and 190' supported by a shaft 198 which retain the blanks 12' after positioning by the pusher plate 66.

The elevation view of the FIGURE 3 shows generally, the blank input hopper at the left, the coating station indicated at 142, the drying turret 58 at the right, and immediately below the drying turret 58, the blank output hopper 84.

The plurality of hopper bars 134 form the input hopper and support a stack of blanks 12 upon the feed table comprised of the sections 136, 138 and 140. The advancing bars 14 and 16 are positioned between the sections of the feed table, only the advancing bar 16 being visible in the FIGURE 3, so that when the pressure is reduced in the advancing bars 14 and 16 and the sprocket 34 has rotary motion applied thereto, the pitman 32 will carry the carriage 26 forward and through the connections 22 and 24, will also advance the advancing bars 14 and 16. As a result, the lowermost blank 12 will be advanced toward the cooling station 142.

Power may be supplied to the apparatus of the FIGURE 3 in any suitable manner such as by a motor (not shown) coupled to rotate the shaft 214 as will be further explained. The shaft 214 rotates the sprocket 70 thereon and, through the chain 74, rotates the sprocket 72 which is mounted on the stub shaft 73. The sprocket 36 also on the shaft 214 engages the chain 38 and drives the sprocket 34 through the chain 38, thus effecting the advancement of the carriage mechanism 26, the advancing bars 14 and 16, and the advancing fingers 40 and 42 associated therewith.

The apparatus of the FIGURE 3 may be supported upon a base member 164 having a column 166 extending from the left side and a column 168 extending from the right side of the base member 164. A longitudinal frame member 170 is supported near the upper ends of the columns 166 and 168, the frame member 170 being substantially parallel to the base member 164. Extending upward from the frame member 170 are a plurality of brackets for supporting the feed table, input hopper, coating station, etc. such as the brackets 172, 174 and 176. The bracket 176 also supports the bracket 160 to which the shaft 152 is connected, which shaft 152 supports and positions the hold-down fingers 148 and 150 of the FIGURE 2. The extruder gun 86 is held in place by the bracket 174 which has the projection 178 flush against and secured to the frame member 170. The pellet hopper 98 is shown in the FIGURE 3 in block form while the remaining extrudate or plastic heating and supply system is shown in a similar manner. The plastic is supplied to the extruder gun 86 of the coating station 142 by a vertical conduit 118 which is heated and insulated by a surrounding sleeve 182.

The turret 58 is supported from the longitudinal frame member 170 by the angular supports 184 and 184', only the support 184 being shown in the FIGURE 3. The coated blanks 12' are delivered by the advancing fingers 40 and 42 to adjacent pairs of blank retaining fingers 64 forming a portion of the turret 58. As the blanks 12' are delivered to the turret, they are not driven against the hub 62 so as to possibly damage the blanks in any manner but are delivered in the position substantially as shown in the FIGURE 3. Thereafter, as the turret 58 continues its rotation, the blanks 12' are gently eased against the hub 62 by gravity and remain in that position until the particular blank reaches the vertical position. Thereafter, the blank is then supported by the adjacent retaining fingers 64 until it is finally discharged at the output hopper 84. However, as the blank being advanced by the turret 58 reaches a position on a clock sequence of approximately 4 o'clock, the blanks 12' will move downwardly and be retained on the blank retaining fingers 64 by a transverse tip 186 formed at the end of each of the blank retaining fingers 64.

As the blank 12' approaches the suspending bars 68 and 68', it will contact a pair of stripper plates 69 and 69' mounted on the pusher plate 66 and be forced by the stripper plates 69 and 69' from its position in the turret 58 and will drop into the output hopper 84. At that time, the crank arm 76 will have moved the pusher plate 66 leftwardly through the cooperation of the sprocket 72, so that sufficient space is available for the deposition of the blank 12'. The stacked blanks 12' of the stack indicated at 188 in the output hopper 84, are retained in place at its active end by the pivoted arms 190 and 190' and a downwardly projecting tip 192 will engage and hold successive blanks as they are pushed against the stack 188 by the pusher plate 66. Downward movement of the arms 190 and 190' is prevented by the stack 188 and pins 189 and 189' extending from shaft 198 on which rests a bolt 180 projecting from each of the arms 190 and 190'. The other end of the stack 188 may be retained by any suitable means such as a sliding block 194, as shown. The output hopper 84 includes a bracket 196 which supports the shaft 198 to which the arms 190 and 190' are pivotally mounted. A pair of wire loops 200 and 200', only the loop 200 being shown in the FIGURE 3, is affixed to the arms 190 and 190' by the same bolts 180 that rest on the pins 189 and 189' so as to direct the coated blanks 12' into the area provided for them between the pusher plate 66 and the stack 188. Side guides 202 and 202' are supported away from the base member 164 by a pair of small brackets 204. The side guides 202 and 202' provide a means of defining the output hopper 84 so as to stack the coated blanks 12' in a neat and orderly fashion.

The view illustrated in the FIGURE 4 is a sectional view taken along the line 4—4 of the FIGURE 3 and illustrates primarily the apparatus below the feed table having the sections 136, 138 and 140. This view also provides a plan view of the output hopper 84. The pitman or crank arm 32 is connected to reciprocate the carriage 26 upon the slide bars 28 and 30 and is connected by a bracket 206 to the driving chains 38 and 38' positioned about the sprockets 34 and 36. A main drive shaft housing 208 supports a shaft 214 which rotates the sprocket 70 as well as the dual sprocket 36. Power may be applied by any suitable means to the belt drive 210 which rotates a pulley 212. The pulley 212 is freely rotatably mounted on the main shaft 214 supported within the main drive shaft housing 208. The pulley 212 has an integral sprocket 213 that supplies rotary motion to a pair of speed step down sprockets identified as 216 mounted on a countershaft 218 which are employed to back drive the main shaft 214 at a low rate of speed through a sprocket 209 fixed to the main shaft. The drive sprocket 78 for driving the turret 58 is also mounted on the countershaft 218 and drives the turret through the chain 82 as shown in FIGURES 1 and 2.

With continued reference to the FIGURE 4, it will be noted that a transverse frame member 220 is suitably secured to the longitudinal frame members 170 and 170'. A pair of blocks 222 and 222' are employed to support one end of the slide bars 28 and 30, respectively, while their opposite ends are supported by apertured blocks 224 and 224' secured, respectively, to the longitudinal frame members 170 and 170'. The double sprocket 34 is suitably mounted in a pillow block 226 or other bearing arrangement extending from the base member 164.

The sprocket 72 is driven from the sprocket 70 by the chain 74 and there is positioned upon the face of the sprocket 72 an eccentrically disposed boss 228 to which is connected the crank arm 76 that drives the pusher plate 66 for assisting in the stacking of the coated blanks 12' as they are deposited in the output hopper 84. As the coated blanks 12' are stripped from the turret by the stripper plates 69 and 69' and drop into the output hopper 84, the pusher plate 66 would normally be leftwardly, as viewed in the FIGURE 4, so that each coated blank 12' will drop unobstructively into the hopper 84. Thereafter, the pusher plate 66 will be driven rightwardly so as to move the newly arrived coated blank 12' under the tips 192 and 192', best shown in the FIGURE 3, extending from the pivoted arms 190 and 190'.

The heating system for bringing the plastic pellets up to the extrusion temperature and maintaining the liquid plastic at the desired temperature may take any convenient form, such as the temperature controlled manifold 108 of the FIGURES 3 and 4 which communicates via the conduit 118 with the extruder gun 86. It will be readily apparent to one skilled in the art that wrap-around flexible heaters may be most conveniently employed for maintaining the desired temperature of the manifold and the conduit coupled with the extruder gun 86. In addition, means may be employed for circulating the molten plastic so as to maintain a continuous and fresh supply of molten plastic at the correct temperature and viscosity to the discharge orifice of the extruder gun 86.

The FIGURE 5 is a sectional view taken along the line 5—5 of the FIGURE 3 and illustrates the three sections comprising the feed table and permits an end elevational view of the advancing bars, their means of support and propelling mechanism. The columns 166 and 166' are connected to a transverse frame member 220 and a pair of longitudinal frame members 170 and 170'. An extension 230 extends from the frame member 170 and includes means to support the section 140 of the feed table and a bracket 232 (not shown in the FIGURE 5) and a cantilever bracket 236 which, respectively, are connected to the clamping members 233 and 238 for retaining the hopper bars 134 in a vertical position. Similarly, an extension 234 is secured to the longitudinal frame member 170' and supports the first section 136 of the feed table. An angle or cantilever bracket 236 maintains, through the cooperation of a clamping member 238, one of the forward hopper bars 134 in a vertical position. A similar bracket 232 through the clamping member 233 maintains the rightmost hopper bar 134 in position.

The middle section 138 of the feed table is supported by any suitable means from the transverse frame member 220 such as by the plate 240. Connected to the underside of the feed table 138 and directed inwardly, are the channelled guides 48 and 48' which receive the finger slide block 46. The guides 48 and 48' may be connected to the feed table 138 by any suitable means, such as by the bolts, as shown. The guides 48 and 48' may be of brass so as to reduce the friction and permit better lubrication when its surfaces are supplied with a lubricant.

With continued reference to the FIGURE 5 it will be noted that the carriage 26 comprises a centrally positioned straight section 242, a bracket 244 secured to the section 242 and connecting the pitman 56 to the carriage 26, a substantially rectangular section 242 which slides upon the slide bar 30, and a substantially similar rectangular section 248 which slides upon the slide bar 28. The advancing bar 14 which cooperates with the advancing bar 16 to advance the uncoated blanks 12 to and through the coating station, is supported upon the rectangular section 248 by the connection 22 while the advancing bar 16 is supported upon the rectangular section 246 by the section 24. Vacuum or reduced pressure may be selectively maintained within the advancing bars 14 and 16 by a conduit 250 which includes a flexible hose portion so as to permit the carriage 26 and the vacuum blank advancing bars 14 and 16 to reciprocate. The conduit 250 communicates with the sets of apertures 18′ and 20′ in the bars 14 and 16, respectively, and another similar conduit (not shown) with the apertures 18 and 20. Suitable shut-off valves, only the valve 251 being shown, are provided so that the conduits can be selectively communicated to supply vacuum to the desired set or sets of apertures depending upon the blank size. A reduced pressure supply 253 is connected by a conduit 262 to a three-way solenoid valve 255. A conduit 257 connects the valve 255 to the shut-off valves such as the valve 251 shown. The valve 251 is connected to the conduit 250. The solenoid valve 255 is controlled by the timing cam 19 mounted for rotation on the shaft 73. The switch 21 is operated by the cam 19 in timed relationship with the position of the blank advancing bars 14 and 16. A pair of conductors 259 and 261 connect the switch 21 to the three-way solenoid valve 255 so that the switch 21 controls the valve operation when contacts 96 are suitably electrically energized. The timed operation of the valve 255 results in reducing the pressure in the bars 14 and 16 at the start of and during the blank pick-up and forward stroke of the bars and the introduction of atmospheric pressure in the bars 14 and 16 just prior to and during the return stroke so that the forwarded blank is released at the end of the forward stroke.

Uncoated blanks 12 would be supported upon the feed table sections 136, 138 and 140 behind the hopper bars 134 and directly over the advancing bars 14 and 16 and in front of the remaining hopper bars 134. It was set forth earlier, that the hopper bars 134 formed the input hopper for the uncoated blanks 12 and that apertures formed in the advancing bars 14 and 16 could be caused to selectively draw air in through the vacuum system so as to cause uncoated blanks 12 to adhere thereto and to be advanced through the coating station.

Projecting from the carriage 26 is a bracket 252 to which the pitman 32 is connected and from which the carriage 26 is supplied its reciprocating motion.

With reference to the FIGURE 6, an elevational view of the coating station is shown along with the position of the carriage 26 while commencing its movement from right to left and again, in dotted outline, at its leftmost position where it is delivering coated blanks 12′ to the turret. More specifically, the sprocket 34 is shown in driven engagement by the sprocket 36 through the cooperation of the chain 38. As previously set forth, a bracket 206 is mounted upon the chain 38 so as to provide reciprocating motion to the pitman 32, which pitman 32 is connected to the bracket 252 so as to impart the reciprocating motion to the carriage 26. It will be recalled that the carriage 26 provides reciprocating motion to both the advancing bars 14 and 16 for initially advancing uncoated blanks 12 and also to the advancing fingers 40 and 42 so as to advance the coated blanks 12′ from the coating station to the turret 58.

The FIGURE 6 is directed primarily to the construction of the coating station and the mechanism for advancing the coated blanks 12′ from the coating station to the turret. For the purposes of illustration, the advancing bar 16 is shown in dotted outline and would, through the cooperation of the other advancing bar 14, advance the uncoated blanks 12 from the input hopper to and through the blank edge guide 90 of the coating station. Thereafter, the now coated blanks 12′ would be advanced by the means shown in the FIGURE 6. In the position shown in solid outline for the carriage 26, the bellcrank 52 is being urged clockwise around its stud 54 so that the projection of the bellcrank 52 engages the lever 50 coupled to the advancing finger 42 so as to urge the advancing finger 42 upwards and above the surface of the feed table 138 so as to engage a coated blank which would be positioned upon the feed table 138. This movement from right to left as viewed in the FIGURE 6 continues to the position shown in phantom outline where it will be observed that the bracket 206 connected to the pitman 32 and being driven by the chain 38, has advanced to its leftmost position so that the return (the motion from left to right as viewed in the FIGURE 6) of the carriage 26 now takes place. Although a number of operations take place in regard to the bellcrank 52 and the advancing fingers 40 and 42 during the initial return of the carriage 26 from left to right, for convenience, these operations may be discussed with reference to the bellcrank 52, advancing finger 42, etc. in the position shown in FIGURE 6, although in actual practice, the foregoing elements would be to the left and off the sheet of drawing. As the pitman 56 is now urged rightwardly through its connection 244 with the carriage 26, the bellcrank 52 now rotates counterclockwise about its stud 54 so that the lever 50, which is connected to the advancing finger 42, now rotates clockwise about its stud so as to permit the tip of the advancing finger 42 to fall below the plane of the feed table 138. After this initial motion, the bellcrank 52 engages a stop (not shown) so that the finger slide bar 46 within the channelled guide 48′, now commences its left to right travel. In its lowermost position, the lever 50 engages an adjusting stud 254 which permits an adjustment of the return position of the advanacing finger 42. The advancing finger 42 must be below the plane of the feed table 138 so that it will clear the coated blank 12′ positioned upon the feed table 136, 138 and 140 and not engage the blank 12′ so as to tear or mutilate it in any way.

After the bracket 206 connected to the pitman 32 has reached the position shown in solid outline in the FIGURE 6, the motion of the carriage 26 reverses so that the pitman 56 now rocks the bellcrank 52 about its stud 54. This action lifts the lever 50 from the adjustment stud 54 and drives the tip of the advancing fingers 40 and 42 (only the finger 42 is shown in the FIGURE 6) above the the plane of the feed table 138 so as to engage the coated blank 12′ now positioned thereupon.

It was set forth earlier that the advancing bars 14 and 16 (only the advancing bar 16 is shown in the FIGURE 6) would advance the uncoated blanks 12 from the input hopper through the coating station which includes the extruder gun 86 and the blank edge guide 90 which serves not only to guide the blank 12 being coated, but also houses the discharge orifice of the extruder gun 86. The switch 88 is positioned above the blank edge guide 90 so as to detect the presence of an uncoated blank 12 in the blank edge guide 90 and to actuate the extruder gun 86 so as to initiate the extrusion or coating action of the extruder gun 86.

In the FIGURE 6, a means is provided for maintaining the chain 38 in a taut position since any slack in the chain would produce undesirable motion of the carriage 26. This means includes a stationary pivot 256 about which the sprocket 34 may be rocked on a lever 260. A spring 258 exerts pressure on the lever 260 so as to urge the sprocket 34 rightwardly so that the chain 38 remains taut at all times.

The FIGURE 7 affords a view, from between the input hopper and the coating station and looking toward the turret 58. This illustration affords a detailed explanation of the coating station and the advancing mechanism for advancing the coating blanks 12′ from the station. The figure is taken along the line 7—7 of the FIGURE 3. After a coated blank 12′ is advanced by the vacuum blank advancing bars 14 and 16 from the input hopper through the coating station, its forward motion is momentarily halted and is retained in position by the hold-down fingers 148 and 150, the hold-down finger 150 being shown in the FIGURE 7. Thereafter, the coated blank 12' is engaged by the advancing fingers 40 and 42 for removal to the turret 58.

As shown in the FIGURE 7, the actuating arm 146 of the switch 88 is so positioned that by its operation it will indicate to the extruder gun 86 that a blank 12 is now in position in the blank edge guide 90 to be coated. The blank edge guide 90 includes a channel 264 which may be in the form of a slot for receiving and guiding the blank 12. The channel 264 communicates with the discharge orifice of the extruder gun 86 so that the coating may be directed to and only to the raw, uncoated severed edge of the normally coated blank 12.

The hold-down finger 150 which is in the form of a leaf spring is supported upon the shaft 152 and adjustment is provided by the adjustment bolt 154. A bracket 160 is secured to the frame of the apparatus so as to support the shaft 152. The advancing fingers 40 and 42 are shown in their positions in the FIGURE 7 as a coated blank 12' is being advanced from a position adjacent the coating station to the turret 58. As previously set forth, the advancing fingers 40 and 42 would be below the plane of the feed table 138 during its return motion before accepting another coated blank 12'. The operation of the advancing fingers 40 and 42 and associated mechanism has been described in detail with reference to the FIGURE 6.

The extruder gun 86 of the FIGURE 7 may be one of conventional design and known in the art to which has been connected the blank edge guide 90 having its channel 264 formed therein. The extruder gun 86 is secured to the longitudinal frame member 170 by a bracket 174, as shown, and is supplied extrudate or plastic at the extrusion temperature by the conduit 118 which is covered by a heating element taking the form of a coil 266 embedded in the sleeve 182. In this manner, the desired temperature of the coating material is maintained. A piston 268 positioned within a cylinder 270 is biased leftwardly by a spring 272. A pressure source 94 communicates with one side of the piston 268 through an electrically operated valve 92. When a suitable source of power is supplied to the terminals 96, the actuating arm 146 of the switch 88 will close its contacts and complete the circuit when a blank 12 is positioned within the channel 264 and ready to be coated, so that the valve 92 will be opened, thus permitting pressure from the source 94 to be applied against the piston 268 and, overcoming the bias of the spring 272, drive the piston 268 rightwardly thus permitting plastic within the conduit 118, to be discharged from the discharge orifice to thereby result in a coating being applied to the desired edge of the blank 12. As soon as the blank 12 is coated, the actuating arm 262 is urged downwardly, thus opening the contacts within the switch 88 and inhibiting the valve 92 from applying pressure to the piston 268. As a result, the piston 268 is urged leftwardly under the biasing effect of the spring 272 and closes a plastic flow control valve (not shown, but within the extruder gun 86) to inhibit the extrusion of plastic until the arrival of another blank 12 as indicated by the electrical detecting circuitry including the switch 88 and its actuating arm 146.

The FIGURE 8 is an elevational sectional view taken along the line 8—8 of the FIGURE 3 and illustrating a portion of the plastic coating or extrudate supply system. The apparatus is housed within a suitable housing 278 which supports within, by any suitable means, the cylinders 100 and 102 having the bores 104 and 106, respectively, centrally located within. Positioned within each of the bores 104 and 106, are the pistons 110 and 112, respectively, which have shoulders 280 and 282 in the form of increased diameters of the pistons 110 and 112, respectively. A switch 126 is supported by the housing 278 and has an actuating arm 284 which rides along the side of the piston 110 and when it engages the shoulder or raised portion 280, the switch contacts are closed so as to actuate the solenoid valves 120 and 122, as set forth in the FIGURE 1. Similarly, the switch 130 has its actuating arm 286 positioned so as to engage the side of its associated piston 112 and upon the closing of the switch contact by the shoulder or raised portion 282, the solenoid valves 120 and 122 of the FIGURE 1 will be actuated but in a reverse sequence to that when actuated by the switch 126.

Positioned within the housing 278 and about the cylinders 100 and 102, is the insulation 288 which serves to insulate and retain the heat applied to its associated mechanism whether through the application of heat through heating devices, not shown, or through the heat created by the force of compressing and moving the plastic pellets.

A pellet hopper 98 is positioned about the housing 278 and communicates with each of the cylinders 100 and 102 by a pair of cone-shaped members 290 and 290' which serve as funnels to permit the passage of plastic pellets 292 from the hopper 98 through apertures 294 and 294' opening through the top of each of the bores 104 and 106. Whenever the pistons 110 and 112 are in their retracted or rearward position, the apertures 294 and 294' are unblocked so that the pellets 292 will fall into the bores 104 and 106 and in front of their respective pistons 110 and 112. As the pistons are actuated in the manner set forth with reference to the FIGURE 1, the plastic pellets 292 will be alternately applied to the system.

The FIGURE 9 is a sectional view taken along the line 9—9 of the FIGURE 8 and illustrates in detail the manner in which the pellets 292 are fed into the system. When the piston 112 is in the position as shown, which is the retracted or rearward position, a number of the pellets 292 are free to move into the bore 106 through an aperture 294'. Thereafter, the piston 112 is driven forwardly so that the entrapped pellets 292 will be forced toward the manifold 108. As the piston 112 is being driven in the direction shown by the arrow, the aperture 294' will be closed off, thus forcing a supply of the pellets 292 into the system. When the piston 112 again assumes the position shown in the FIGURE 9, an additional supply of pellets 292 will be introduced into the apparatus.

OPERATION

The operation of the apparatus will now be discussed in detail with reference ot the FIGURES 1 and 2.

A supply of uncoated blanks 12 is positioned in the input hopper. After suitable power is supplied to the terminals 96 and the plastic supply has arrived at the desired extrusion or coating temperature, the main power source is actuated so as to apply rotary motion to the various drives. The vacuum blank advancing bars 14 and 16 would be evacuated by the opening of the solenoid valve 255 by the switch 21 and the cam 19 and through the cooperation of the bracket 206 and the pitman 32, the carriage 26 would be carried forward as the bracket 206 follows the path prescribed by the chain 38. Since the advancing bars 14 and 16 are rigidly coupled to the carriage 26, the advancing bars 14 and 16 will grip the lowermost blank 12 from the stack and advance it toward the coating station. As the motion continues, the edge of the blank 12 to be coated is advanced through the channel 264 (FIGURE 7) formed in the blank edge guide 90 connected to the extruder gun 86. As the blank 12 approaches the discharge orifice positioned within the channel 264 of the blank edge guide 90, the switch 88 will be actuated so as to cause the solenoid valve 92 to open the pressure source 94 and apply pressure to the extruder gun 86 and thereby cause its actuation. As a result, a coating of plastic is applied to the edge of the blank 12.

As soon as the coated blank 12' clears the discharge orifice in the blank edge guide 90, the contacts of the switch 88 will open thus inhibiting the operation of the extruder gun 86. The advancing bars 14 and 16 continue to propel the blank 12' along the blank path formed on top of the feed table 136, 138 and 140 to approximately the position shown by the blank 12a of the FIGURE 2. In this position, the coated blank 12' is positioned under the hold-down fingers 148 and 150 and momentarily stops and retains this position until it is advanced by the advancing fingers 40 and 42.

It will be understood that the turret 58 will be rotated through the cooperation of the sprocket 80, the chain 82 and the sprocket 78 on the countershaft 218.

While the advancing bars 14 and 16 were being driven forward or rightwardly as viewed in the FIGURE 1, the advancing fingers 40 and 42 were also being driven forward through the cooperation of the pitman 56; however, since only the first blank has been coated, no blank 12 was available for delivery by the advancing fingers 40 and 42 to the turret 58. Next, the advancing bars 14 and 16 return to their original position since the bracket 206 connected to the chain 38 has reached its greatest point of travel, thus driving the carriage 26 rearwardly or to the left as viewed in the FIGURE 1. The advancing fingers 40 and 42 are also returned and through the cooperation of the bellcrank 52 and the lever 50, the fingers are returned below the surface of the feed table. It will be understood that the apertures in the advancing bars 14 and 16 would be vented to the atmosphere by the repositioning of solenoid valve 255 as soon as the blank reaches the position shown at 12a in the FIGURE 2, so that the blank will be released from the advancing bars 14 and 16.

As soon as the carriage 26 reaches its most leftward position, vacuum is again applied to the advancing bars 14 and 16 through the valve 255 so as to grip the lowermost blank and advance it toward and through the coating station. Simultaneously, the bellcrank 52 engages the lever 50 and rotates the advancing fingers 40 and 42 about their shaft 44, thus raising the fingers 40 and 42 so as to engage and advance the first coated blank 12' from the position shown at 12a in the FIGURE 2 to the position shown at 12b. In other words, while a coated blank 12' is being advanced by the advancing fingers 40 and 42 from the position shown at 12a to the position shown at 12b, the advancing bars 14 and 16 are advancing the next succeeding blank 12 from the stack of blanks to the position shown at 12a, which change in position includes actuation of the extruder gun 86 resulting in the desired coating of the edge of the blank 12.

As the coated blanks 12' are delivered to the turret 58, they are received between the blank retaining fingers 64 and now rotate with the turret 58. During the time that the coated blanks 12' are being advanced toward the output hopper 84 by the turret 58, the edge coating is given an opportunity to dry before the blanks are stacked. Finally, the coated blanks 12' drop from the turret 58 to a position in front of the pusher plate 66. The pusher plate 66 through the cooperation of the sprocket 72 and the crank arm 76, reciprocates so as to push the coated blanks 12' under the tips 192 of the pivoted arm 190 (FIGURE 3) and thereby become completed coated blanks.

While the foregoing is occurring, the plastic pellets from the pellet hopper 98 are being alternately advanced by the pistons 110 and 112 as previously set forth. Suffice it to say by way of explanation at this point, when a respective piston 110 or 112 approaches the end of its forward travel, a switch will be actuated which will commence the advancement of the other piston and after a suitable delay, commence the rearward movement of the same piston after it has reached the full extent of its travel. This alternate reciprocating motion of the pistons 110 and 112 continues and at a rate dependent upon such parameters as pressure, solenoid response time, length of the delay of the delay circuits 128 and 132, pellet particle size, composition of the pellets, temperature of the system, etc.

It will be obvious that if it is desired to coat other edges of the blanks that form the containers, the newly coated stack of blanks in the output hopper can be placed back in the feed hopper with the uncoated edge of the blanks in position to be coated and the operation of the machine resumed. It will be apparent to those skilled in the art that certain adjustments and modifications may be made in the event non-straight edges are to be coated.

It wil also be apparent to those skilled in the art that still other modifications within the scope of the invention but differing from the illustrated embodiment might be utilized. As an example, a commercially available plastic extrudate supply system might be employed in place of the illustrated system. One such unit that provides satisfactory operation even through the principle of operation is different is known as a "Versa Melt" and is manufactured by the Nordson Corporation, Amherst, Ohio.

What is claimed is:

1. Coating apparatus comprising means for receiving an edge portion of an article to be coated, means for applying coating material for deposition upon said edge portion of the article while positioned within said means for receiving, conveying means for serially conveying articles past said means for applying with said edge portion extending into said means for receiving, means for detecting the presence of an article having an edge portion within said means for receiving and means under control of said means for detecting for actuating said means for applying coating material to cause coating material to be deposited upon the edge portion of the article, said conveying means including first means for engaging articles and moving said articles past said means for applying with said edge portion parallel to the path of conveyance, second means for engaging said articles and continuing the conveyance thereof, and actuating means carried by said first means for mechanically actuating said second means.

2. Coating apparatus comprising an input hopper for supporting a stack of articles and an output hopper for receiving articles, means defining a channel positioned intermediate said hoppers for receiving article edges to be coated, means for advancing articles seriatim along a path of conveyance from said input hopper to said output hopper with said edges extending into said channel and including vacuum bar means movable from said input hopper partially along said path of conveyance for moving said articles past said channel and article engaging means driven from and responsive to said vacuum bar means for engaging articles in response to movement of said vacuum bar means and for moving articles away from said channel, means for applying coating material to said edges during passage through said channel, means for detecting the movement of an article to said channel and means under control of said means for detecting for actuating said means for applying coating material to cause coating material to be deposited upon said article edges.

3. Coating apparatus comprising an input hopper for supporting a stack of articles and an output hopper for receiving articles, an extruder gun having a discharge orifice, a channel connected to said gun and communicating with said orifice, means for advancing articles seriatim from said input hopper to said output hopper, the advancing article having an edge received in said channel communicating with said orifice, and means for applying coating material to the edge of the article within said channel, said means for advancing comprising first means slidably movable in the direction of article conveyance for moving articles a part of the distance between said hoppers, second means slidably movable in the direction of article conveyance for moving articles a further part of the distance between said hoppers, said second means including at least one article engaging member movable in a direction transverse to the direction of article conveyance and means linking said first and second means for concurrent sliding movement and for effecting movement of said article engaging member in said transverse direction.

4. Coating apparatus as defined in claim 3 wherein the channel is defined by opposing side walls and a bottom wall joining said side walls, the gun being disposed with its orifice opening through said bottom wall so as to directly apply the extrudate against the article edge to be coated with edge defining marginal portions of each article confined between and against the channel side walls.

5. Blank edge coating apparatus comprising an input hopper for supporting a stack of blanks and an output hopper for receiving blanks, a channel intermediate said hoppers, vacuum bar means movable past said channel for advancing blanks seriatim from said input hopper to said output hopper and passing the edge to be coated linearly through said channel, means for applying coating material to the surface of the blank edge exposed to said channel including an extruder gun having a discharge orifice communicating with said channel, means for detecting the presence of a blank edge exposed to said channel, means under control of said means for detecting for actuating said means for applying coating material including switch means responsive to the entrance of the edge of each blank into said channel for controlling said extruder gun and extrudate supply means including first and second alternating piston and cylinder extrudate heating and compressing means and an extrudate supply line interconnecting said gun and said first and second piston and cylinder means.

6. Blank edge coating apparatus comprisilng an input hopper for supporting a stack of flat blanks to be transported along a path to an output hopper for receiving said blanks, an extruder gun having a discharge orifice, a channel connected to said gun and communicating with said orifice, means for advancing blanks seriatim from said input hopper to said output hopper including blank delaying means, the advancing blank exposing one of its edges to said channel communicating with said orifice, and means for applying coating material to the edge of the blank exposed to said channel, said blank delaying means permitting the drying of the coating material before the advancement of the article to the output hopper and including turret means for receiving conveyed blanks and for discharging said blanks in a substantially vertical plane and means for moving said blanks while vertically disposed to said output hopper.

7. The combination as defined in claim 6 wherein said means for advancing blanks includes a first means for removing blanks from said input hopper and advancing them a predetermined amount and a second means driven from said first means for receiving blanks from said first means and continuing the advancement of the blanks to said turret means.

8. The combination as defined in claim 7 wherein said first means includes vacuum bars partially positioned under said input hopper.

9. The combination as defined in claim 7 wherein said second means for advancing is a pair of fingers having a blank engaging position during a portion of their travel and a blank nonengaging position during their return travel.

10. Edge coating apparatus comprising means for serially conveying aricles, means for idspensing coating material for deposition upon an edge of the article in transit on said means for conveying, means for repeatedly actuating said means for dispensing in response to movement of each article on said means for conveying, and means coupled to said means for dispensing coating material for supplying the coating material, said means for supplying the coating material comprising air actuated cylinder means for alterantely advancing pistons in cylinders which receive the coating material for compression therein.

11. The combination as defined in claim 10 wherein said air cylinder means includes a first cylinder and a second cylinder, the cylinders alternately actuating first and second pistons coupled, respectively, to said first and second air cylinders.

12. The combination as defined in claim 11 including means responsive to movement of the first piston toward the end of its advancement cycle for actuating said second air cylinder and a time delay means for retraction of said first piston through said first air cylinder after expiration of the period associated with said time delay means.

13. Coating apparatus comprising a channel for receiving articles to be coated, fluid actuated extrusion gun means communicating with said channel for dispensing coating material, fluid control means for actuating said extrusion gun means, alternately reciprocable means for supplying coating material under pressure to said means for dispensing, means actuating said means for supplying independently of said extrusion gun means and means for elevating and maintaining the temperature of the coating material from said alternately reciprocable means to said extrusion gun means.

14. Edge coating apparatus comprising means for conveying articles to be coated along a predetermined path and means aligned with edges of articles being conveyed for dispensing coating material, supply means including alternately reciprocable means for supplying coating mateiral under pressure to said means for dispensing, said alternately reciprocable means including a first air cylinder for actuating a first coating material compressing piston and a second air cylinder for actuating a second coating material compressing piston, said pistons alternately engaging coating material and causing its advancement to said means for dispensing, and means connected to said first piston for actuating, near the end of its forward cycle, said first air cylinder to cause its rearward cycle after a predetermined delay and for actuating said second air cylinder to cause immediate commencement of its forward cycle.

15. The combination as defined in claim 14 including means connected to said second piston for actuating, near the end of its forward cycle, the rearward cycle of said second air cylinder after a predetermined delay and for effecting the immediate commencement of the forward cycle of said first air cylinder.

16. The combination as defined in claim 14 wherein said first air cylinder is under control of a first solenoid actuated valve and said second air cylinder is under control of a second solenoid actuated control valve, each of said solenoid actuated control valve having a first position for causing a forward cycle of operation of its associated air cylinder and a second position causing a rearward cycle of operation, means associated with said first piston for causing, toward the end of its forward cycle of operation, said second solenoid actuated valve to assume its first position and said first solenoid operated valve to assume its second position after a predetermined delay, and means associated with said second piston to cause, toward the end of its cycle of operation, said first solenoid actuated valve to assume its first position of operation and said second solenoid actuated valve to assume its second position of operation after a predetermined delay.

17. The combination as defined in claim 12 including hopper means for supplying coating material to be supplied to said means for dispensing by the advancement of coating material from said hopper means by said first and second pistons.

18. Blank edge coating apparatus comprising means for maintaining a quantity of blanks disposed horizontally in face-to-face relation, means for moving the lowermost blank in a horizontal plane away from said means for maintaining including means for applying a reduced pressure to the lowermost face of the lowermost blank, extrusion means for extruding coating material onto an edge of said blank during movement by said means for moving means for actuating said extrusion means only upon alignment of a blank and said extrusion means, means for supplying coating material to said extrusion means including means for heating and compressing solid coating material particles to produce a fluid extrudate, means for removing blanks from proximate said extrusion means including blank engaging means movable into and out of the conveyance path of said blanks and means linked with said means for moving said blank engaging means into said path of conveyance and horizontally away from said extrusion means, turret means for moving said blank circularly for drying thereof and means for receiving blanks from said turret means in a generally vertical plane and for stacking received blanks on edge while generally vertically disposed.

References Cited

UNITED STATES PATENTS

| | | |
|---|---|---|
| 2,271,063 | 1/1942 | De Mattia. |
| 2,549,000 | 4/1951 | Palmer _____ 118—236 X |
| 3,081,213 | 3/1963 | Chinn. |
| 3,146,126 | 8/1964 | Baker _____ 118—2 |
| 3,180,250 | 4/1965 | Johnson et al. |
| 3,298,353 | 1/1967 | Huffman _____ 118—411 |
| 3,354,501 | 11/1967 | Bachman et al. |

ROBERT W. JENKINS, Primary Examiner

JOHN P. McINTOSH, Assistant Examiner

U.S. Cl. X.R.

118—410